United States Patent Office 2,812,262
Patented Nov. 5, 1957

2,812,262

BRINES CONTAINING SODIUM TRIPOLYPHOSPHATE

Morris Wasserman, Chicago, Ill., assignor to Meat Industry Suppliers, Inc., Northfield, Ill., a corporation of Illinois No Drawing. Application April 30, 1956,
Serial No. 581,307

7 Claims. (Cl. 99—222)

The instant invention relates to methods for increasing the solubility of sodium tripolyphosphate in aqueous solutions containing sodium chloride. More particularly, it relates to methods for increasing the solubility and stability of aqueous brines or pickles containing sodium tripolyphosphate used in the curing of fresh meat.

Sodium tripolyphosphate is used as a constituent of the salt-containing pickles used for curing meat. Generally, the pickle contains between 1% and 5% of sodium tripolyphosphate along with salt, sugar, sodium nitrite and/or nitrate, and various spices. Difficulty is encountered in dissolving the sodium tripolyphosphate in the pickle because it contains between 10% and 20% of salt which decreases the solubility of the tripolyphosphate therein, and causes the tripolyphosphate to precipitate from the pickle upon standing.

In an attempt to overcome this difficulty, some meat processors first dissolve the sodium tripolyphosphate in water and add the other ingredients for the curing pickle to it. However, it would be more convenient for many processors if the sodium tripolyphosphate could be added to previously prepared curing pickles. Some meat processors have added sodium acid pyrophosphate to the pickles in order to increase the solubility of the sodium tripolyphosphate; however, the resulting pickles are not clear but have a powdery appearance.

It is an object of the instant invention to provide methods for increasing the solubility of and the stability of sodium tripolyphosphate in aqueous solutions containing salt, such as brines and curing pickles.

It is a further object of the instant invention to provide methods for easily dissolving increased amounts of sodium tripolyphosphate in brines and in pickles, used for the curing of fresh meat.

It is a further object of the instant invention to provide a composition for addition to brines, curing pickles, or the like which comprises sodium tripolyphosphate and a compound which renders the tripolyphosphate more soluble in salt-containing solutions.

These and other objects of the instant invention will become more apparent from the description that follows.

It has been found that the solubility of sodium tripolyphosphate in aqueous solutions containing salt is substantially increased by the presence of monosodium phosphate therein. The ratio of the monosodium phosphate to the sodium tripolyphosphate added to the aqueous brine is between about 1:19 and about 1:2⅓.

In one embodiment of the instant invention, monosodium phosphate and sodium tripolyphosphate are mixed with an aqueous brine or curing pickle, preferably in a ratio between about 1:4 and about 1:9. The resulting brine is agitated for several minutes, and if any solid material remains undissolved, it can be separated from the solution, for example, by filtration, decantation, or other conventional methods. The resulting solution containing the dissolved sodium tripolyphosphate and monosodium phosphate is relatively stable.

The instant invention is applicable to any aqueous solution containing sodium chloride, such as brines and curing pickles. The term "curing pickles" as used herein includes any of the conventional type solutions used for the curing of meat which usually contain between 10% and 25% sodium chloride, nitrite and/or nitrate salts, sugar, spices, and frequently various seasoning agents and condiments. The amount of salt along with the small amount of other solids present in these pickles are generally indicated by a salometer value. Curing pickles conventionally have a salometer value between 30 and 70 degrees.

In another embodiment of the instant invention, a composition containing between about 70% and about 95% sodium tripolyphosphate and between about 5% and about 30% by weight of monosodium phosphate is mixed with an aqueous brine, such as a curing pickle. The resulting liquid is agitated for between about three and about six minutes. The resulting solution is generally clear, however, if a small amount of solids remains, they are removed by filtration.

Usually sufficient sodium tripolyphosphate is added to the curing pickle to produce a meat product containing between about 0.05 and about 1.0%, preferably between about 0.3 and 0.5% by weight of sodium tripolyphosphate. For example, the pickle contains between about 0.5% and about 10% of tripolyphosphate. However, amounts of sodium tripolyphosphate outside this range may be used, if desired.

Although the composition added to the curing pickle may contain between about 5% and about 30% by weight of monosodium phosphate, the composition preferably contains between about 10% and about 20% of monosodium phosphate. Percentages of the monosodium phosphate higher than about 20% are best avoided because the pH of the resulting pickle would be lowered to an undesirable extent. On the other hand, usually at least about 10% of the monosodium phosphate is necessary to solubilize the amount of sodium tripolyphosphate desired in the curing pickle by most processors. Alternatively, the composition containing the sodium tripolyphosphate and the monosodium phosphate may contain or be mixed with other materials which are to be added to the curing pickle, such as sugar, seasoning agents, condiments, and the like. In this case, the ratio of the monosodium phosphate and the sodium tripolyphosphate in the composition is between about 1:19 and about 1:2⅓, preferably about 1:5⅔.

In practicing the instant invention, the monosodium phosphate can be added to the aqueous brine either prior to, at the same time as, or after the addition of the sodium tripolyphosphate. It is generally most convenient to add them at about the same time or in a mixture. The mixing of the sodium tripolyphosphate and the monosodium phosphate with the brine can be carried out over a wide range of temperature, such as at atmospheric temperature or at temperatures generally used in connection with curing such as between about 3° and 5° C. In any case, the monosodium phosphate increases the rate of solution of the sodium tripolyphosphate and increases the stability of the tripolyphosphate in the resulting brine so that there is less tendency for it to precipitate after prolonged standing.

In a preferred embodiment of the instant invention, a composition comprising about 85% by weight of sodium tripolyphosphate and about 15% by weight of monosodium phosphate is mixed with the curing pickle at a temperature between about 3° and about 30° C. The resulting pickle is agitated about three minutes, and the resulting pickle is clear and needs no filtration. The resulting pickle is used for the curing of fresh uncooked meat in conventional type curing processes. The cured meat is then generally at least partially cooked and packaged.

To more clearly illustrate the character of the instant invention, the following examples are given:

I

About 8 ounces of a brine of salt and water having a salometer value of about 70 degrees was mixed with about 17 grams of sodium tripolyphosphate, and the resulting liquid was agitated about three minutes and then filtered. The temperature was about 18° to 19° C. The unfiltered solution had a milky appearance, and the amount of undissolved material was considerable. After filtration, the salometer value of the filtrate was about 81 degrees.

This procedure was repeated except that a mixture of 17 grams of sodium tripolyphosphate and 3 grams of monosodium phosphate was agitated with another 8 ounces of the same brine used above. At the end of three minutes of agitation, there was no undissolved material, and the salometer value was 85 degrees.

II

A typical curing pickle was prepared containing the following: about 50 gallons of water, 6¼ pounds of a commercial curing agent containing about 12% nitrate and about 8% sodium nitrite, about 10 pounds sugar, and sufficient salt to bring the salometer value to about 60 degrees. To about 8 ounces of the above pickle was added about 7 grams of sodium tripolyphosphate. During and after the addition, the pickle was agitated. After several minutes of continuous mixing, the tripolyphosphate had only partially dissolved and a large amount of sediment remained.

A mixture of about 7 grams sodium tripolyphosphate and about 2 grams of monosodium phosphate were added to another 8 ounces of the above pickle. The resulting pickle was agitated for a few minutes. The resulting pickle was clear.

III

A salt brine similar to the one described in Example I, and having a salometer value of about 70 degrees, was prepared. The actual percent by weight of salt was about 18%. A series of five containers each containing 250 ml. of the brine were mixed with varying amounts of a mixture containing 85% of sodium tripolyphosphate and 15% of monosodium phosphate. The brines were mixed with 5, 10, 15, 20, and 25 grams of the mixture. To another series of five containers each holding 250 ml. of brine were added 5, 10, 15, 20, and 25 grams of sodium tripolyphosphate. Each of the ten brines were agitated at about room temperature for about three minutes.

The brines to which sodium tripolyphosphate alone had been added, contained undissolved tripolyphosphate after three minutes of agitation, and, after several minutes standing, precipitation of the tripolyphosphate from the solutions began. In the series to which the combination of the sodium tripolyphosphate and monosodium phosphate had been added, only the solutions to which 20 and 25 grams of the mixture had been added contained small amounts of undissolved material after agitation. This material was removed by filtration and the resulting solutions were clear.

The following tables give the percentage of orthophosphate, of tripolyphosphate, the final pH, and the specific gravity of the solutions:

*Solutions containing sodium tripolyphosphate*

| Gms. Phosphate added | 5 | 10 | 15 | 20 | 25 |
|---|---|---|---|---|---|
| Final pH | 7.70 | 7.70 | 7.65 | 7.55 | 7.52 |
| Specific Gravity | 1.146 | 1.154 | 1.158 | 1.157 | 1.159 |
| Orthophosphate in solution (percent) | 0.08 | 0.08 | 0.08 | 0.08 | 0.04 |
| Tripolyphosphate in solution (percent) | 1.72 | 2.14 | 2.21 | 3.29 | 3.91 |

*Solutions containing sodium tripolyphosphate and monosodium phosphate*

| Gms. Phosphate added | 5 | 10 | 15 | 20 | 25 |
|---|---|---|---|---|---|
| Final pH | 6.10 | 6.08 | 6.03 | 6.03 | 5.88 |
| Specific Gravity | 1.141 | 1.162 | 1.170 | 1.175 | 1.179 |
| Orthophosphate in solution (percent) | 0.26 | 0.52 | 0.78 | 0.98 | 1.30 |
| Tripolyphosphate in solution (percent) | 1.57 | 3.09 | 4.55 | 5.02 | 5.65 |

These tables show that in the presence of monosodium phosphate, the solubility of the sodium tripolyphosphate in the brines is substantially increased. The brines containing the sodium tripolyphosphate without the monosodium phosphate contained much smaller amounts of dissolved sodium tripolyphosphate.

Having thus fully described and illustrated the character of the instant invention, what is desired to be protected by Letters Patent is:

1. A meat curing composition containing a curing preparation, up to about 10% by weight sodium tripolyphosphate, and monosodium phosphate, in amount between about 5% by weight and about 30% by weight of the sodium tripolyphosphate, and wherein the monosodium phosphate is a solubilizing agent which enables the addition of the sodium tripolyphosphate directly to brines in which the meat is cured.

2. A sodium tripolyphosphate-containing composition for addition to meat curing brines and which is readily soluble therein at between about 3° C. and atmospheric temperatures, comprising sodium tripolyphosphate and monosodium phosphate as a solubilizing agent therefor, in a ratio by weight of between about 9:1 and about 4:1.

3. In pickles and brines used for curing meat and consisting essentially of curing preparation, up to about 25% by weight sodium chloride, sodium tripolyphosphate in an amount up to about 10% by weight, and seasoning agents, the additional ingredient monosodium phosphate in an amount between about 10% and about 30% by weight of the sodium tripolyphosphate to maintain a clear brine.

4. A sodium tripolyphosphate containing composition which readily dissolves in aqueous meat curing brines, consisting essentially of sodium tripolyphosphate and between about 5% and about 30% by weight of monosodium phosphate.

5. In processes for curing meat in brines containing sodium tripolyphosphate in amounts up to about 10% by weight, the improvement which enables the direct addition of the sodium tripolyphosphate into said brine which comprises mixing sodium tripolyphosphate and monosodium phosphate solubilizing agent into said brine in a ratio by weight between about 19:1 and about 2⅓:1.

6. The method of claim 5 wherein between about 4 and about 9 parts of sodium tripolyphosphate per part of monosodium phosphate is added to said brine.

7. A method for the rapid and direct incorporation of sodium tripolyphosphate into meat curing brines which comprises mixing sodium tripolyphosphate directly with said brines substantially simultaneously with $NaH_2PO_4$ in ratio by weight of sodium tripolyphosphate to monosodium phosphate of between about 19 to 1 and about 2⅓ to 1.

References Cited in the file of this patent

UNITED STATES PATENTS 2,513,094    Hall    June 27, 1950

FOREIGN PATENTS 696,617    Great Britain    Sept. 2, 1953
519,397    Canada    Dec. 13, 1955